UNITED STATES PATENT OFFICE.

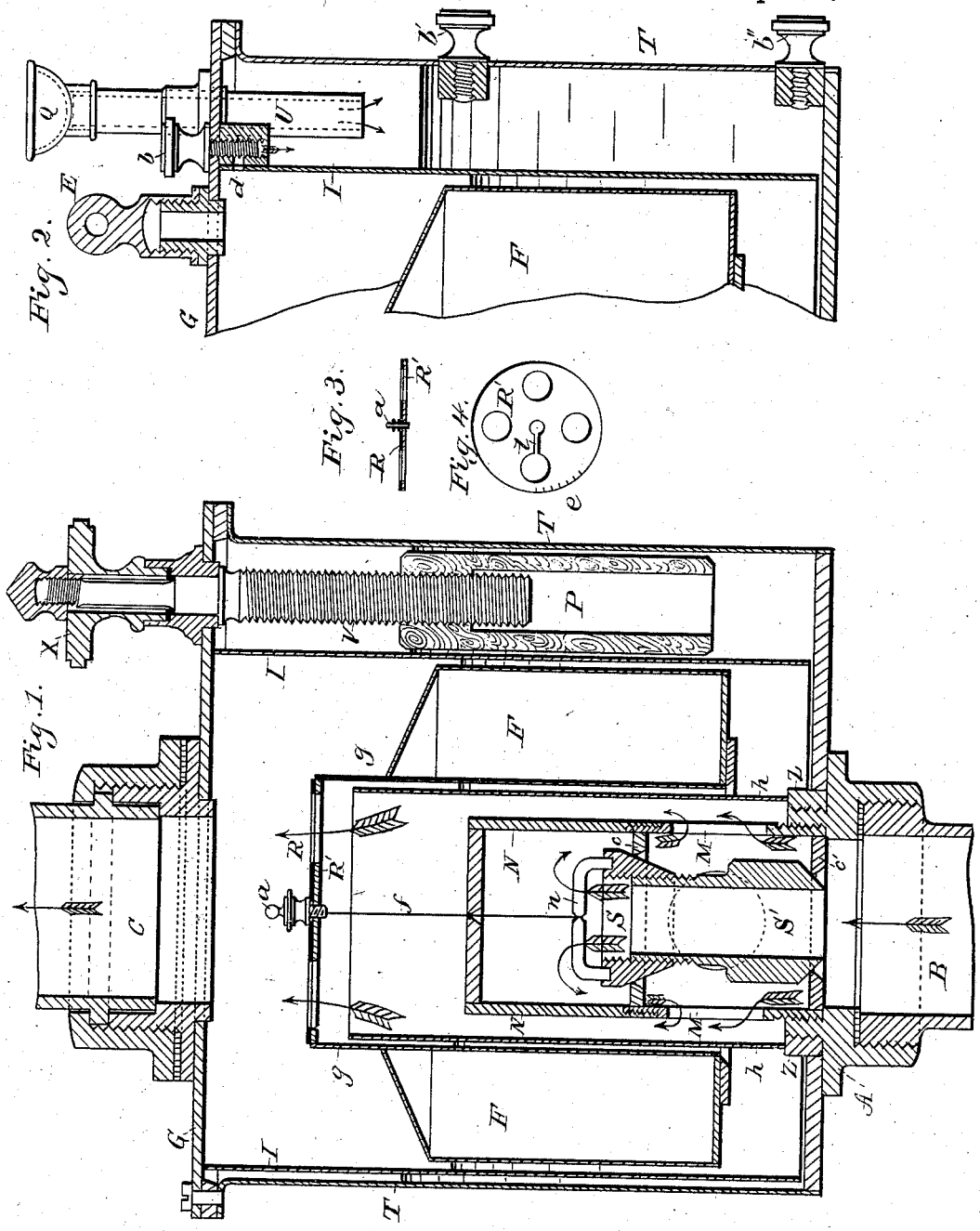

EUGENE DERVAL, OF PARIS, FRANCE.

GAS-PRESSURE REGULATOR.

SPECIFICATION forming part of Letters Patent No. 325,509, dated September 1, 1885.

Application filed July 1, 1885. (No model.) Patented in France February 20, 1885, No. 164,949.

*To all whom it may concern:*

Be it known that I, EUGÈNE DERVAL, a citizen of France, residing at Paris, in the Department of the Seine, France, have invented new and useful Improvements in Gas-Pressure Regulators, (for which I have obtained a patent in France bearing date February 20, 1885, No. 164,949,) of which the following is a specification.

This invention, although not wholly limited thereto, relates more particularly to that class of regulators for controlling the pressure of illuminating-gas in which a float is used to vary the position of the regulator-valve. In these regulators an increase of pressure on the consumption side of the valve lowers the level of the liquid in which the float is placed and allows it to descend, and by partially closing the valve checks the flow into the pressure-chamber until equilibrium is established. On a diminution of the pressure, the level of the liquid rises, the float is raised, and the valve opened to such an extent as to restore the equilibrium. In the other ordinary forms of regulator, which commonly have a diaphragm or a bell for the body, movable under variations of pressure, instead of a liquid, the general operation is the same. The regulation is, however, imperfect where there is considerable variation in the gas consumption, because where a larger quantity of gas is to be forced through the pipes it is necessary, in order to have a uniform supply at the burners or points of consumption, that the pressure at the regulator should be increased, whereas with the ordinary regulators the pressure is kept constant under all conditions of use, or if any change occurs in pressure it is diminished with an increase in consumption.

To effect automatically a variation in the pressure proportionate to the rate of consumption, while maintaining what may be called a constant normal or average pressure, is the principal object of the invention. To this end the gas, after passing the regulator-valve, enters a collecting-chamber, and escapes thence into the distributing-pipes or a chamber connected therewith through an opening or openings of such size as to check the flow somewhat. Thus there is a difference of pressure inside and outside of said chamber, which difference is proportional to the flow, and is utilized to open the regulator-valve to a corresponding extent by connecting said valve with a movable body (such as a diaphragm or partition) arranged to be acted upon in opposite directions by the pressure of the gas inside and outside of said chamber. The valve is also connected with a movable body, which, as in ordinary regulators, is acted upon by the gas-pressure either inside or outside of said chamber, or both, in such manner that the valve is closed more or less as the pressure increases. Thus the valve comes into equilibrium under the action of two forces—namely, the pressure at the regulator on the consumption side of the valve, tending to close the valve as it increases, and the difference in pressure inside and outside of the collecting-chamber due to the flow or rate of consumption, tending to open the valve as it becomes greater. In order to regulate this difference of pressure means are provided for varying the size of the escape-openings of the collecting-chamber, so that the flow of gas may be checked more or less, as desired.

The invention also has for its object to simplify and perfect the construction of gas-regulators, and to this end comprises certain special constructions, combinations, and arrangements of parts, as hereinafter set forth.

The following is a description of what is considered the best mode of applying the principle of the invention, reference being had to the accompanying drawings, in which Figure 1 is a sectional elevation of a gas-regulator constructed in accordance with the invention; Fig. 2, a similar partial view, the section being in another plane; and Figs. 3 and 4, detail views.

The body or casing T of the regulator is divided into two parts by the cylindrical partition I, which is hermetically joined to the cover G and extends nearly to the bottom. In the inner compartment is the annular float F, which is connected with the regulator-valve S S', so that the rise of the float opens and the fall of the same closes the valve. The float F is supported by the liquid, with which the regulator is filled to the proper depth. The liquid is introduced by the funnel Q and pipe M, and can be withdrawn more or less by removing the screws $b'\ b''$. A plunger, P, partly immersed in the liquid, is engaged by the screw *b*, which is provided with a milled head or hand-wheel, X, for turning, so that said plunger can be raised or depressed in order to submerge it more or less, and thereby raise or lower the level of the liquid. By these changes of level the valve S S' is adjusted to maintain the desired pressure in the pipes.

The exterior compartment is or may be open to the air through the tube U.

The valve S S' is hollow, and is made in two parts, screwed together, so that they can be readily separated. The seats for the two parts are formed in the disks *c c'*. A space above the disk *c* is closed by the cap N, the interior of which is in free communication with the inlet-pipe B through the hollow of the valve. The pressure in the cap N evidently tends to close the valve, while that in the inlet-pipe B tends to open it. As the pressure per square inch in the cap N will usually be less than that in pipe B, the upper part, S, of the valve is made a little larger than the lower, so that the valve will be practically balanced. In the drawings, the upper part is so much larger that the lower part, S', will slip through the upper valve-seat, *c*. The cap N is screwed to the pipe M, which is screwed or otherwise fastened to the coupling A, and is provided with openings for the free passage of the gas after it has passed through the valve S S'. The ring Z, forming part of the bottom of the regulator-casing T, is screwed on the coupling A. The tube *h*, soldered at the lower end to the ring Z, surrounds the pipe M and cap N and excludes the liquid from the valve. The latter is suspended from the float F by means of the plate R', the screw *a*, the fine platinum wire *f*, (which passes through a small hole in the cap N,) and the cross-bar *n*. The screw *a* is tapped into the plate R'. The valve can be removed after unscrewing the screw *a* by moving the wire *f* through the slit *t*, (see Fig. 4,) so as to bring the screw opposite one of the large holes in plate R', which is of sufficient size for the screw to pass through it.

It will be observed that the center of gravity of the float and its suspended parts is very low, which is not the case with hydrostatic regulators heretofore made.

The plate R', in connection with the inner wall, *g*, of the float, forms a collecting-chamber which is in communication with the compartment formed by partition I and the distributing or outlet pipe C through the holes in the plate R'. In order to regulate the size of these holes a similar adjustable plate, R, is placed on the plate R', and is retained in position by the screw *a*. By turning the plate R the size of the openings can be regulated. Practically it forms a valve for controlling the flow from the collecting-chamber.

Assuming that the gas is being consumed and the valve S S' open to the proper extent to give the desired pressure inside the partition I, the operation is as follows: If the pressure rise in the inlet-pipe B, a momentary increase of pressure will take place inside the regulator, the liquid-level inside the partition I will be depressed, the float F will fall, and the valve S S' close sufficiently to compensate for the increase of pressure. On the other hand, if the pressure in the inlet-pipe B diminish, the reverse action takes place, the float rises and lifts the valve, so as to allow the gas to enter more freely. If more burners be lighted, a momentary fall in pressure takes place within the regulator, the liquid flows from the outer to the inner compartment, the float rises, the valve S S' is opened, and an increased flow of gas takes place. This increased flow tends still further to lift the valve, for it collects in the chamber formed by the plate R' and wall *g* faster than it can escape by the openings in the plates R R', and thus exerts a pressure upward, lifting the float F to a certain extent, out of the liquid, and opening the valve S S' to a corresponding extent. Equilibrium is established when the difference in pressure between the inside and outside of the collecting-chamber is balanced by the weight of the float and valve, which has been lifted by the superior pressure inside. The pressure in the outlet-pipe C will be higher than it would be except for the action of the collecting-chamber in opening the valve, and thus a larger quantity of gas will be forced through the pipes without lowering the pressure at the burners. The increase in pressure will, moreover, be proportionate to the flow. The amount of the increase can be regulated by adjusting the valve-plate R, so as to check the flow from the collecting-chamber more or less, as required. The more the flow is checked the greater will be the difference in pressure between the inside and outside of said chamber, and the greater the lifting force tending to open the valve.

It will of course be understood that the openings should not be made so small that a full supply of gas will not pass through them. To facilitate the adjustment one or both plates may be provided with graduations or marks, as shown at *e*, Fig. 4.

When burners are turned off and the consumption of gas diminished, the pressure in the regulator increases, the level of the liquid inside the partition I is depressed, the float descends, and the valve is partly closed. At the same time, the flow being less, the difference in pressure between the inside and outside of the collecting-chamber is less, and the float sinks deeper in the liquid and closes the valve S S' to a corresponding degree.

Sometimes it may be desirable to use the full head of pressure in the inlet-pipe B. In such case the pipe U is plugged, and the screw *b* is raised, so as to put the compartments in free communication through the hole *d* in partition I. The level of the liquid will then be the same in both compartments.

Of course the regulation due to the rise and fall of the valve under the action of the pressure in the collecting-chamber could be had under these conditions, if desired.

A screw-cap, E, is provided for enabling a manometer or a burner to be applied to the regulator in order to facilitate the adjustment of the apparatus.

The apparatus shown is mainly designed for the use of private gas-consumers; but the same or a similar one could also be used in gas-works or wherever else its use may be desired.

Forms, proportions, dimensions, materials, and other details can be varied without departing from the spirit of the invention, and parts of the invention may be used separately.

I claim—

1. A fluid-pressure regulator comprising, in combination with the regulator-valve and a movable device connected with said valve for opening it when the pressure in the regulator diminishes and closing it when it increases, a collecting-chamber provided with openings for the escape of the fluid into the outlet or distributing pipe, and a movable body acted upon in opposite directions by the pressure inside and outside said collecting-chamber and connected with said valve, so that an excess of pressure inside tends to open the valve, substantially as described.

2. The combination, with the regulator-valve, the collecting-chamber provided with escape-openings, and the movable body acted upon in opposite directions by the pressure of the fluid before and after it has passed through said openings, of the adjustable plate or valve for adjusting the size of said openings, substantially as described.

3. The combination of the float, the regulator-valve, and the collecting-chamber forming part of said float and provided with escape-openings, said parts being arranged as explained, so that the valve opens on the rise and closes on the fall of the float, substantially as described.

4. The combination of the float, the regulator-valve, the collecting-chamber forming part of said float and provided with escape-openings, and the valve or adjustable plate for regulating the size of said openings, substantially as described.

5. The combination, with the float or movable device in a pressure-regulator, of the two-part hollow balanced valve and the double valve-seat, substantially as described.

6. The combination, with the body or casing divided into two compartments communicating at the bottom, of the float in one of said compartments and the regulator-valve suspended from said float, said valve being arranged to close the inlet-opening on the fall and open it on the rise of said float, substantially as described.

7. The combination, with the body or casing, the partition depending from the top and dividing it into two compartments communicating at the bottom, the float in one compartment, and the regulator-valve connected with said float, of the movable plug closing an opening at the top of the partition, for enabling the two compartments to be put in communication at the top also, substantially as described.

8. The combination of the annular float, the perforated plates forming a collecting-chamber in the middle of said float and one of them being adjustable, and the regulator-valve connected with said float, substantially as described.

9. The combination, with the two-part hollow valve, of the double seat and the cap forming a closed chamber above the upper seat, substantially as described.

In testimony whereof I have signed this specification in the presence of two subscribing witnesses.

EUGÈNE DERVAL.

Witnesses:
J. A. AYOLLEY,
ARTHUR GOOD.